(No Model.) 2 Sheets—Sheet 2.
J. HUNT.
METHOD OF AND APPARATUS FOR EXTRACTING AIR FROM BEER.
No. 517,161. Patented Mar. 27, 1894.
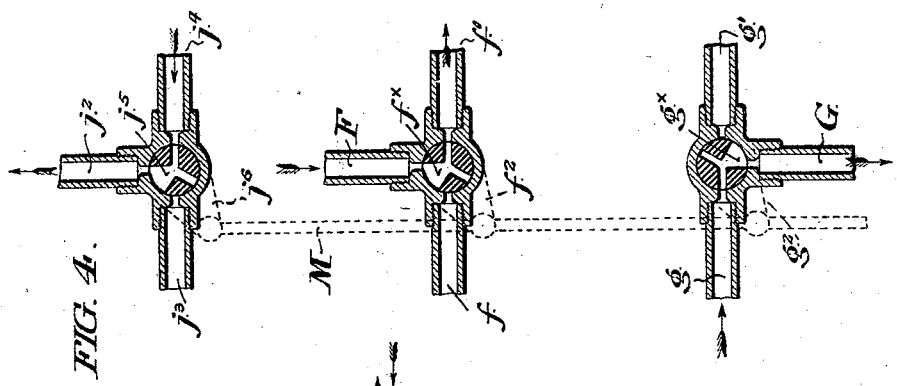
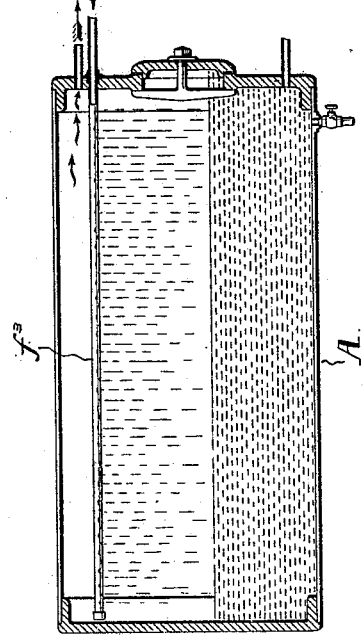
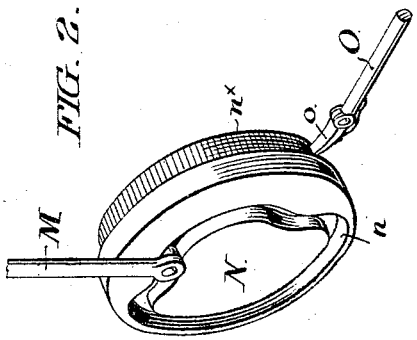
WITNESSES:
James Hunt
INVENTOR
By his attorneys
Strawbridge & Taylor

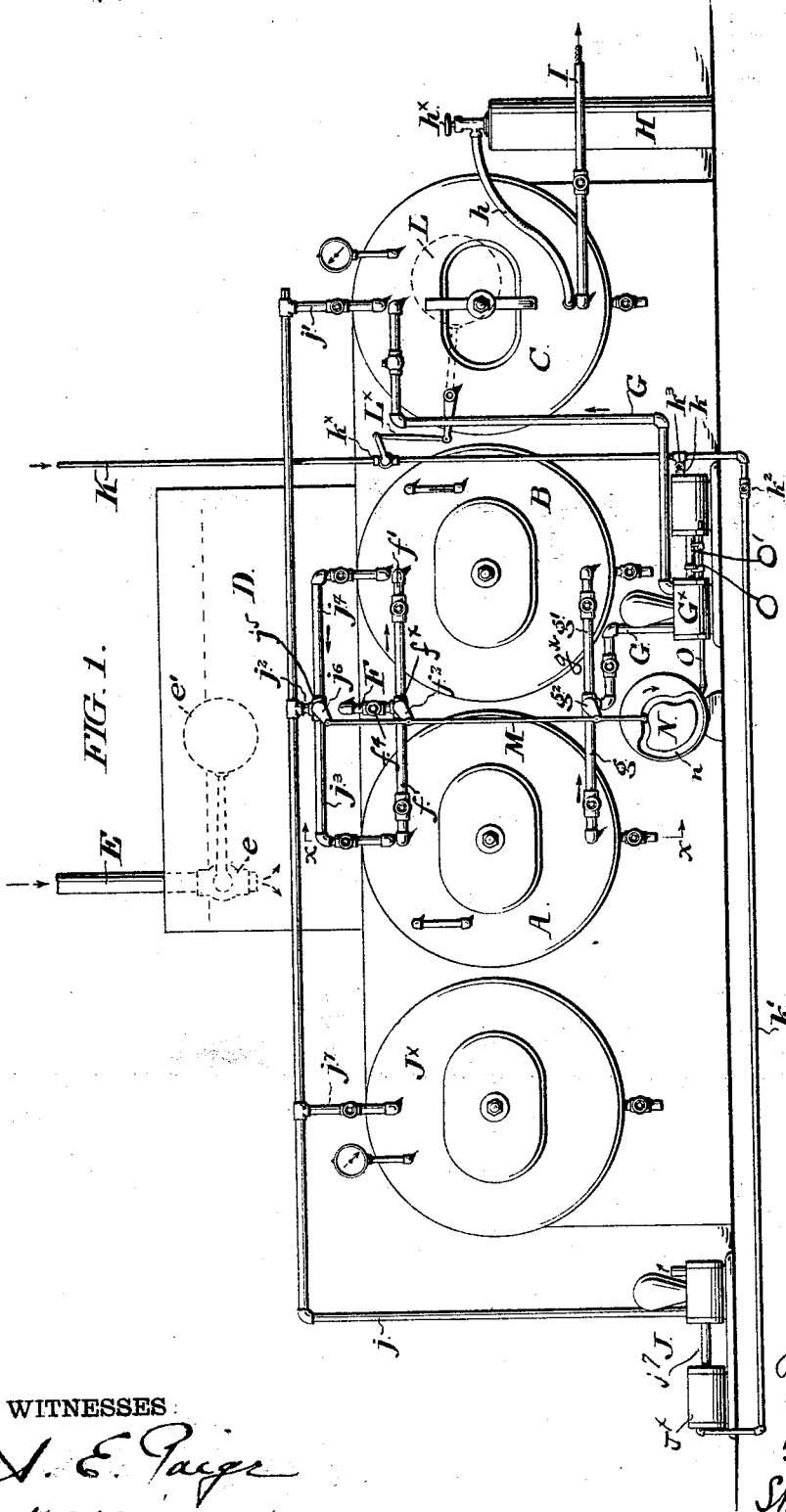

UNITED STATES PATENT OFFICE.

JAMES HUNT, OF PHILADELPHIA, PENNSYLVANIA, ASSIGNOR TO THE UNIVERSAL FOOD AND LIQUID IMPROVING COMPANY, OF SAME PLACE.

METHOD OF AND APPARATUS FOR EXTRACTING AIR FROM BEER.

SPECIFICATION forming part of Letters Patent No. 517,161, dated March 27, 1894.

Application filed September 11, 1893. Serial No. 485,257. (No model.)

*To all whom it may concern:*

Be it known that I, JAMES HUNT, a citizen of the United States, residing in the city and county of Philadelphia, in the State of Pennsylvania, have invented a new and useful Method of and Apparatus for Extracting Air from Beer and other Liquids, of which the following is a specification.

In the storage of beer in bottles and other packages it is desirable that it should be freed from air as far as possible, for the reason that the presence of air within the bottles or packages tends to occasion fermentation which effects a deterioration in the quality of the beer; for the reason that the extraction of the air from the beer increases the palatability of the latter; and for the reason that beer may be more satisfactorily and thoroughly charged with carbonic acid gas when freed from air.

It is the object of my invention to provide as a step preliminary to the deposit of beer in bottles and other packages, a method of and apparatus by which the air is, in an economical and simple manner, thoroughly extracted from the beer, and the beer which is then charged with carbonic acid gas continuously supplied to the bottling or other apparatus by which it is deposited in its ultimate packages.

In the accompanying drawings I show, and herein I describe, an apparatus of a good form devised by me and well adapted to effectuate my process.

In the accompanying drawings, Figure 1 is a view in front elevation of my apparatus. Fig. 2 is a view in perspective of a cam and a valve rod and tappet rod mounted and employed in connection therewith. Fig. 3 is a vertical, central, longitudinal, sectional elevation through the separating tank A, section being taken on the dotted line $x$—$x$ of Fig. 1. Fig. 4 is a sectional view of the valves which control the separating tanks, and the valve rod (shown in dotted line) employed in connection therewith.

Similar letters of reference indicate corresponding parts.

In the drawings, A B are what I term separator tanks, being two counterpart tanks of ordinary construction, preferably mounted in adjacency to each other, and C is what I term a charging tank, being conveniently a tank of about the same character as the tanks A B.

D is a reservoir tank conveniently supported in any desired manner at an elevation greater than that of the tanks A B, into which reservoir D discharges a supply pipe E supposed in communication with any suitable source of supply of liquid, the discharge end of which pipe is, as shown in dotted lines, provided with a valve $e$ controlled by a float $e'$, which operates, in a manner well known to those familiar with this class of apparatus, to limit the height of the liquid level in said tank. A pipe F, hereinafter termed a branch pipe, leads from the tank D, and is provided with two branches $f\ f'$, which respectively lead to and discharge into the separator tanks A B. A three-way cock $f^\times$ is mounted at the junction of said branches with the main pipe F, and is provided with an operating handle $f^2$. The pipes $f\ f'$ are conveniently provided within the tanks A B with extensions $f^3$ which extend from end to end of the tanks and, being perforated, deliver the liquid, received from the tank D, through their perforations in the form of a shower or spray.

$g\ g'$ are pipes which respectively lead from the lower portions of the respective tanks A B and unite to form the main pipe G, hereinafter referred to as a branch pipe, which leads to and discharges into the charging tank C. Intermediate of its length the pipe G is connected or placed in circuit with a fluid pump $G^\times$. A three-way cock or valve $g^\times$ is provided at the junction of the branch pipes $g\ g'$ with the main pipe G, said cock having an operating handle $g^2$.

H is a tank of carbonic acid gas connected by a pipe $h$ with the charging tank C, said pipe $h$ entering said tank C at a point near the base thereof and below the ordinary level of the liquid contained therein.

I is a pipe leading out from the lower portion of the charging tank C, and supposed in communication with the ultimate storage vessel, or apparatus by which the beer is to be placed in bottles or other packages.

J is a vacuum pump, and $j$ is a pipe leading therefrom, in communication with the charging tank C through the pipe $j'$, and in communication with the separator tanks A B through the pipe $j^2$ which is provided with branches $j^3$ $j^4$ which lead to said respective separator tanks.

$j^5$ is a three-way cock or valve situated at the junction of said pipes $j^3$ $j^4$, and $j^6$ is the operating handle of said cock $j^5$.

$J^\times$ is a vacuum tank, situated in the vicinity of the vacuum pump J, and in communication with the pipe $j$ through the pipe $j^7$. This vacuum tank serves as an auxiliary to the vacuum pump, both to receive the surplus of air, in excess of the capacity of the pump, which flows through the pipe $j$ when communication is first made through said pipe with the several tanks, and also serves, when communication between the pipe $j$ and the tanks A B C is shut off, as a reservoir upon which the continuously operating pump may draw so that the pump may always receive sufficient air to serve as a cushion for its piston.

K is a steampipe supposed in communication with any suitable source of steam supply, one branch of which, $k$, controlled by a cock $k^3$, leads to and operates the pump $G^\times$, and the other branch of which $k'$, controlled by the cock $k^2$, leads to and operates the pump J.

$k^\times$ is a cock or valve which, after the apparatus has been started in operation and the valves $k^3$ $k^2$ are both open, controls said pipe K, and is situated in adjacency to the charging tank C.

L is a float pivotally mounted in the usual manner within the charging tank and connected by a suitable link $L^\times$ with the handle of the cock $k^\times$, with the result that, when the liquid within the tank C reaches a predetermined level, the elevation of the float will occasion the drawing down of the link $L^\times$ and the closing of the cock $k^\times$ to shut off the supply of steam to the pumps, and therefore occasion the stoppage of the flow of liquid to said tank C. The lowering of the level of the liquid in said tank C by the constant escape of the liquid through the pipe I will then occasion the opening of the cock $k^\times$ and the resumption of the flow of liquid to the tank C.

The operation of the apparatus will be readily understood: The tanks being arranged as shown in Fig. 1, the cock $k^2$ being open and the cocks $k^3$ and $f^\times$ closed, the vacuum pump J is started, and the tank C, as well as the tanks A and B, and incidentally, also, the vacuum tank $J^\times$ are exhausted. The tanks A and B are exhausted in succession, that is to say, the valve $j^5$ is first so set as to place the one, A, and after it is exhausted the other, B, of the said tanks, in communication with the pipe $j$. After the second of said tanks is exhausted, and the valve is still so set as to maintain said tank in communication with the pipe $j$, the valves of the branch pipe F are so set as to place said tank B in communication with the tank D and liquid from the tank D is thereupon discharged into said separator tank B in the form of spray until the latter is sufficiently full. During this filling operation the vacuum pump remains in communication with said separator tank B, and thoroughly removes whatever air may enter with or be contained in the beer, or other liquid. When the tank B has thus received a sufficient quantity of liquid, the cock $k^3$ is opened to start the pump $G^\times$ in operation, and the valve $g^\times$ turned so that the liquid in the tank B may be pumped through the pipes $g'$ and G to the charging tank C, which is, at this time, cut off from communication with the pipe $j$, while the valves $f^\times$ and $j^5$ are set to place the tank A in communication with the pipe $j$ and the tank D, and said tank A is thereupon supplied with liquid which is exhausted of air as it enters said tank, as described with reference to the filling of the tank B. In the continued operation of the apparatus, liquid is being fed to one tank in the form of small drops, and freed from air by being exposed to the action of the vacuum pump, while liquid is being taken from the other previously filled tank and discharged into the charging tank. The tanks being thus used alternately, one being filled while the other is being emptied, a continuous flow of liquid into the charging tank is maintained. To effectuate the alternating arrangement described, the cocks $j^5$, $f^\times$, and $g^\times$, have two positions, one being that in which the cock $j^5$ is open to the pipe $j^4$, the cock $f^\times$ open to the pipe $f'$, and the cock $g^\times$ open to the pipe $g$,—and the other being that in which the cock $j^5$ is open to the pipe $j^3$, the cock $f^\times$ open to the pipe $f$, and the cock $g^\times$ open to the pipe $g'$. I provide, for the automatic reversal of the valves, a valve rod M, connected to the valve or cock handles $j^6, f^2$, and $g^2$, the arrangement being such that the elevation of the rod will set the cocks in one, and the depression of the rod will set them in the other, of said positions.

N is a wheel, having a cam groove $n$ in which the inturned lower end of the rod M is entered, and also having a series of peripheral teeth $n^\times$.

O is a rod mounted for axial reciprocation in suitable bearings, having at its front end a spur $o$ adapted to engage with the teeth $n^\times$ and provided intermediately of its length with tappets.

O' is a tappet collar on the piston rod of the pump $G^\times$, adapted in the reciprocation of said piston rod, to make contact alternately with said tappets and occasion the reciprocation of the rod O, and consequently the rotation of the wheel N and through the cam groove $n$ the alternate elevation and depression of the valve rod M, at the appropriate and predetermined times. This valve changing device is a device of convenience, and other mechanism operative to the same result, may, if desired, be substituted in its stead.

The several branch pipes are provided with cocks of ordinary construction adapted to be manually operated, by which may be accomplished the alternate opening and closing of the branches of the pipes, when the device is first started, and before the pump G<sup>×</sup> is placed in operation to pump liquid from the separator tanks and to operate the valve rod M which controls the automatically operated three way cocks described. When the pump G<sup>×</sup> begins to pump the liquid into the charging tank C, the cock $h^×$ which controls the carbonic acid tank H is opened and the liberated gas passes through the pipe $h$ into the tank C. In practice I have found that after the liquid has been freed from air the gas combines with it much more readily than with liquid containing air, and also that it absorbs much more gas, in proportion to its own volume, than the ordinary liquid containing air. So much of the gas passing into the charging tank as is not taken up by the liquid rises above the level of the liquid in said tank, and, acting expansively, operates to force the liquid out of the tank through the pipe I to its place of ultimate storage or deposit, preferably in air exhausted packages.

Having thus described my invention, I claim and desire to secure by Letters Patent—

1. The herein described process of treating liquids preparatory to impregnating them with gas, which consists in reducing said liquid to the form of drops or minute streams within a vessel from which the air has been exhausted, substantially as specified.

2. The herein described process of treating liquid, which consists in reducing said liquid to the form of drops or small streams within a vessel, contemporaneously subjecting said vessel to the action of an exhauster, and subsequently charging carbonic acid gas into the liquid, substantially as specified.

3. The herein described process of treating liquid which consists in reducing said liquid to the form of drops or minute streams within a vessel, contemporaneously subjecting said vessel to the action of an exhauster, transferring said liquid, maintained against access of air, to an independent vessel which has been previously exhausted of air, and charging carbonic acid into said liquid, as specified.

4. The process of treating liquid, which consists in reducing it to the form of drops or minute streams within a vessel from which air has previously been exhausted, in contemporaneously subjecting said liquid within said vessel to the action of an exhauster, and in transferring said liquid, maintained against access of air, to the presence of carbonic acid gas within an independent vessel which has previously been exhausted of air, as specified.

5. In an apparatus for treating liquid, in combination, a separator tank in communication with a source of liquid supply, a charging tank in communication with a source of carbonic acid gas supply, a pipe connection extending from the separator tank to the charging tank and in circuit with a pump, and an exhauster in communication with said separator and charging tanks, substantially as set forth.

6. In combination, a pair of separator tanks in communication with a source of liquid supply, a charging tank in communication with the separator tanks, a gas tank in communication with the charging tank, an exhauster in communication with the separator tanks and the charging tank, and means for controlling the communication established among the several tanks, substantially as set forth.

7. In combination, a pair of separator tanks in communication with a source of liquid supply, a charging tank in communication with the separator tanks, a gas tank in communication with the charging tank, an exhauster in communication with the separator tanks and the charging tank, and means for automatically controlling the communication established among the several tanks, substantially as set forth.

8. In combination, a supply tank, a charging tank in communication with a source of gas supply, an exhauster, a pipe leading from the exhauster to the charging tank, a pair of separator tanks, a branch pipe by which the supply tank is connected to said separator tanks, a branch pipe by which the exhauster pipe is connected to the said separator tanks, and a branch pipe by which the charging tank is connected to the said separator tanks, and suitable cocks or valves which control said branch pipes, substantially as set forth.

9. In combination, a supply tank, a charging tank in communication with a source of gas supply, an exhauster, a pipe leading from the exhauster to the charging tank, a pair of separator tanks, a branch pipe by which the supply tank is connected to said separator tanks, a branch pipe by which the exhauster pipe is connected to the said separator tanks, and a branch pipe by which the charging tank is connected to the said separator tanks, suitable cocks or valves which control said branch pipes, and automatic devices which control the set of said cocks or valves, substantially as set forth.

10. In combination, a supply tank, a charging tank in communication with a source of gas supply, an exhauster, a pipe leading from the exhauster to the charging tank, a pair of separator tanks, a branch pipe by which the supply tank is connected to said separator tanks, a three way cock mounted in said branch pipe, a branch pipe by which the exhauster pipe is connected to the separator tanks, a three way cock mounted in said branch pipe, a branch pipe by which the charging tank is connected to the separator tanks, a liquid pump in circuit with said last named branch pipe, a three way cock mounted in said last named branch pipe, a gas tank connected with the charging tank, a wheel embodying a cam groove, a valve rod engaged in said cam groove and engaged with the three way cocks, and means connective of the liquid pump and said wheel for occasioning the regulated movement of said wheel, substantially as set forth.

11. In an apparatus for charging liquids with gas, in combination, a closed charging vessel, an exhauster in communication with said charging vessel, a source of liquid supply in communication with said charging vessel, a source of gas supply in communication with said charging vessel, and a liquid outlet from said charging vessel, substantially as set forth.

In testimony that I claim the foregoing as my invention I have hereunto signed my name this 4th day of September, A. D. 1893.

JAMES HUNT.

In presence of—
  ALFRED S. DOVE,
  F. NORMAN DIXON.